United States Patent
Kuo (10) Patent No.: US 10,429,164 B2
(45) Date of Patent: Oct. 1, 2019

(54) TAPE MEASURE STRUCTURE

(71) Applicant: TOP LONG INDUSTRIAL CO., LTD., New Taipei (TW)

(72) Inventor: Shao-Fan Kuo, New Taipei (TW)

(73) Assignee: TOP LONG INDUSTRIAL CO., LTD., New Taipei (TW)

(*) Notice: Subject to any disclaimer, the term of this patent is extended or adjusted under 35 U.S.C. 154(b) by 177 days.

(21) Appl. No.: 15/785,445

(22) Filed: Oct. 17, 2017

(65) Prior Publication Data
US 2019/0113322 A1    Apr. 18, 2019

(51) Int. Cl.
*G01B 3/10* (2006.01)

(52) U.S. Cl.
CPC ........ *G01B 3/1041* (2013.01); *G01B 3/1005* (2013.01); *G01B 2003/1033* (2013.01); *G01B 2003/1043* (2013.01); *G01B 2003/1053* (2013.01)

(58) Field of Classification Search
CPC .......... G01B 3/1005; G01B 2003/1007; G01B 2003/1015; G01B 2003/102
USPC .......................................... 33/767
See application file for complete search history.

(56) References Cited

U.S. PATENT DOCUMENTS

| | | | | |
|---|---|---|---|---|
| 4,194,703 A | * | 3/1980 | Roe | G01B 3/1005 242/381.3 |
| 5,657,551 A | * | 8/1997 | Lin | G01B 3/1005 242/381.3 |
| 6,026,585 A | * | 2/2000 | Li | G01B 3/1005 242/381.3 |
| 6,463,670 B1 | * | 10/2002 | Usami | G01B 3/1005 33/755 |
| 6,470,590 B1 | * | 10/2002 | Lee | G01B 3/1005 33/767 |
| 6,595,451 B1 | * | 7/2003 | Kang | B65H 75/4421 242/381.2 |
| 2003/0029955 A1 | * | 2/2003 | Hsu | G01B 3/1005 242/380 |
| 2007/0012812 A1 | * | 1/2007 | Lin | G01B 3/1005 242/379 |
| 2010/0064540 A1 | * | 3/2010 | Huang | G01B 3/1005 33/767 |
| 2015/0089826 A1 | * | 4/2015 | Villalpando | G01B 3/1084 33/701 |
| 2018/0224263 A1 | * | 8/2018 | Kolade | G01B 3/1005 |

* cited by examiner

*Primary Examiner* — George B Bennett
(74) *Attorney, Agent, or Firm* — Leong C. Lei (57) ABSTRACT

A tape measure structure is characterized in that an access opening of a housing assembly is configured with a flexible control element capable of being pressed to touch and stop a tape body movably installed inside the housing assembly, and a buffer for buffering the tape body is configured on one side of the flexible control element adjacent to the access opening. Whereby, the present invention can avoid the damage to the tape body, prevent the injury to users, and does not interfere hand feeling so as to make the operation convenient.

12 Claims, 11 Drawing Sheets

TAPE MEASURE STRUCTURE

(a) TECHNICAL FIELD OF THE INVENTION

The present invention relates to a tape measure structure, and more particularly to a tape measure structure avoiding abrasion, preventing users from being damaged, and convenient for operation without interfering with hand feeling.

(b) DESCRIPTION OF THE PRIOR ART

Traditional tape measures include an outer housing, winder configured inside the outer housing, tape body wound around the winder and fixing block movably configured on the outer housing, where the tape body can be pulled out to carry out measurement and the fixing block can also be operated to move to be in touch with and fix the ruler body when used. However, the fixing block is made of hard material such that it will cause abrasion to the tape body. In addition, the fixing block is selectively fixed to the housing such that the operation has no hand feeling and is unable to adjust the recovery speed of the tape body.

Therefore, conventional touch tape measures are available in the market; they are characterized in that the housing thereof has an opening for the exposedness of the tape body, allowing users to put a finger in the opening, and the finger is directly used to touch to adjust the recovery speed of the ruler body, which is possible to damage the finger according to use experience.

SUMMARY OF THE INVENTION

To overcome the drawbacks mentioned above, the present invention is proposed.

The main object of the present invention is to provide a tape measure structure, capable of reducing the abrasion to a tape body and preventing users from being injured.

Another object of the present invention is to provide a tape measure structure, capable of operation through the sense of touch.

To achieve the objects mentioned above, the present invention proposes a tape measure structure, including: at least one housing assembly; at least one rotation disk, movably configured inside the housing assembly; at least one tape body, movably put around the rotation disk, one end thereof selectively passed out of the housing assembly; at least one access opening, configured on the housing assembly and allowing the tape body to be passed out thereof; at least one operation portion, configured on one side of the housing assembly adjacent to the access opening; at least one combination portion, configured inside the housing assembly and positioned on one side of the operation portion; at least one flexible control element, coupled to the combination portion and adapted to shield a part of the tape body exposed out of the operation portion, and deformable to touch and stop the tape body after pressed down; and at least one buffer, configured on one side of the flexible control element adjacent to the access opening.

Therefore, a user may press the flexible control element to deform it to touch the tape body to stop it without needing to directly touch the tape body with a finger during use, thereby preventing the user from being injured and reducing the abrasion to the tape body. In addition, users may use the flexible control element to achieve the objects of direct operation and adjustment through the sense of touch. Furthermore, when the tape body is wound back, the buffering of the buffer can be used to reduce the damage to the tape body and the sound generated from collision.

DETAILED DESCRIPTION OF THE PREFERRED EMBODIMENTS

Figure 1:
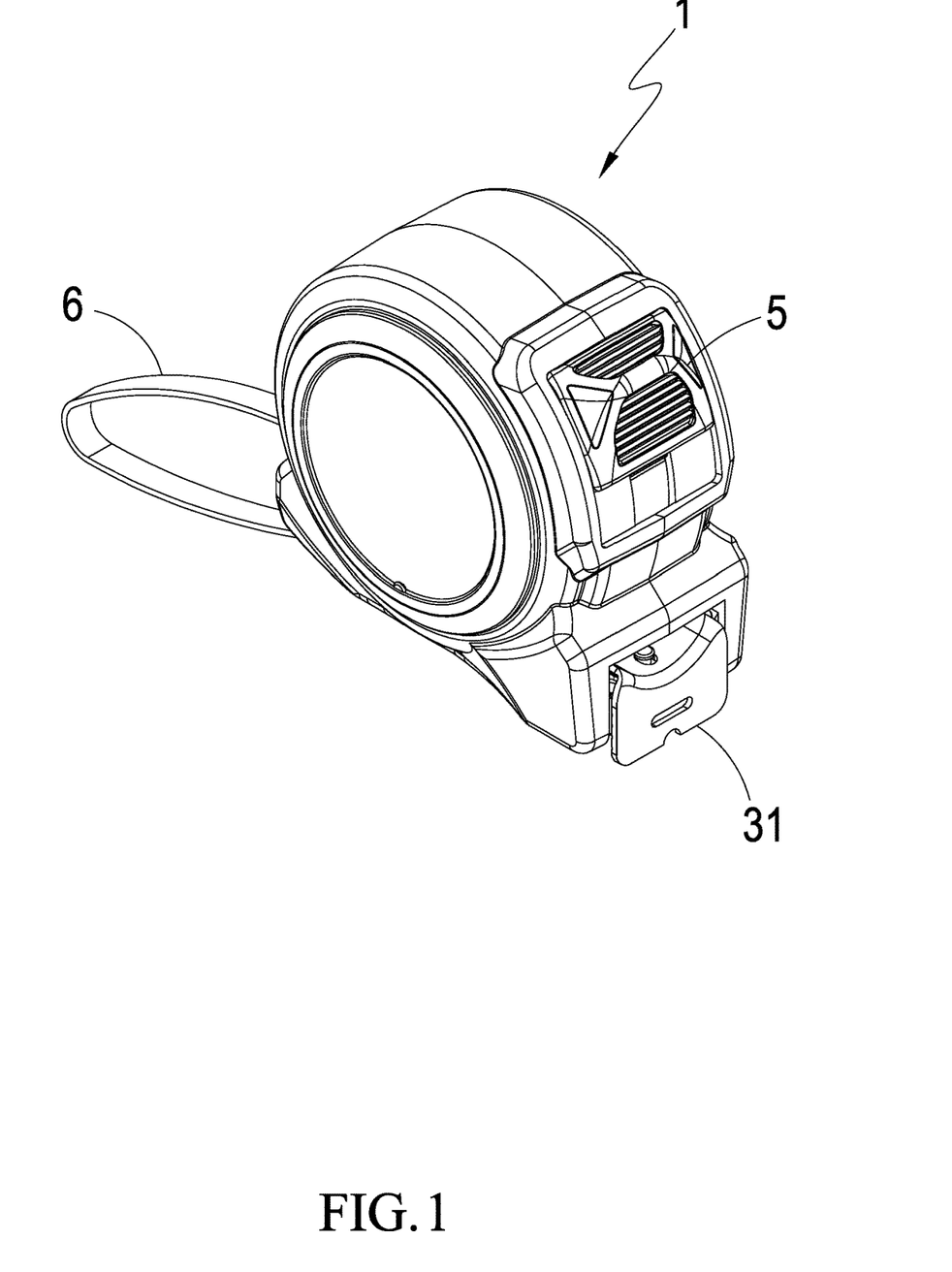
FIG. 1 is a perspective view of a first preferred embodiment of a tape measure structure of the present invention.
Figure 2:
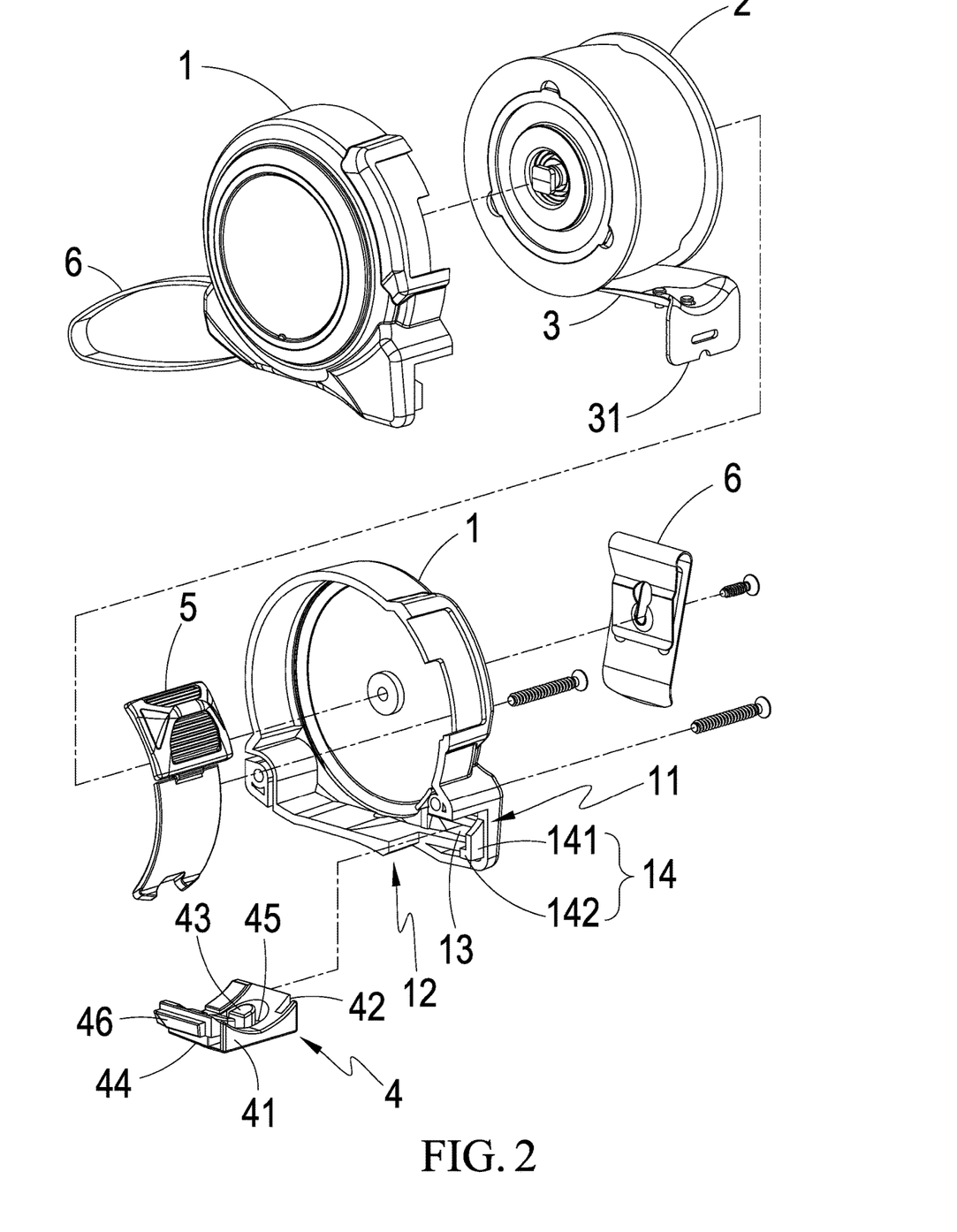
FIG. 2 is a cross-sectional view of the tape measure structure shown in FIG. 1.

Referring to FIGS. 1 and 2, a tape measure structure of the present invention mainly includes a housing assembly 1, at least one rotation disk 2, at least one tape body 3 and at least one flexible control element 4, where the rotation disk 2 is movably configured inside the housing assembly 1, and tape body 3 is movably wound around the rotation disk 2, the end of which is selectively passed out of the housing assembly 1, where the rotation disk 2 includes at least one elastic element adapted to wind back the tape body 3.

The housing assembly 1 has at least one access opening 11 allowing the tape body 3 to be passed out thereof, at least one operation portion 12 corresponding to the tape body 3 is configured on one side of the housing assembly 1 adjacent to the access opening 11, and at least one combination portion 13 positioned at one side of the operation portion 12 is configured inside the housing assembly 1.

Furthermore, the flexible control element 4 is coupled to the combination portion 13 by means of plug, fastening or injection; here, plug is taken as an implementation in the embodiment. The flexible control element 4 is configured with at least one butt joint 46 having a shape similar to the combination 13 configured on the flexible control element 4 such that the combination portion 13 is put around the but joint 46 so as to increase a fixation effect. In addition, the flexible control element 4 can be pressed in a deformable way to touch and stop the tape body 3, and shield the part of the tape body 3 exposed out of the operation portion 12. Furthermore, at least one brake 43 is configured on one side of the flexible control element 4 adjacent to the tape body 3, and at least one pressing portion 44 another side thereof away from the tape body 3. In addition, the flexible control element 4 is formed with at least one bending portion 45 to facilitate deformation.

At least one buffer 41 is configured on one side of the flexible control element 4 adjacent to the access opening 11, and at least one limit portion positioned on one side of the buffer 41 away from the access opening 11 is configured on the flexible control element 4, and at least one support portion 14 inserted in the limit portion 42 to prevent the flexible control element 4 from being moved and separated is configured on the housing assembly 1 adjacent to the access opening 11. Furthermore, at least one hook 21 corresponding to the buffer 41 is configured on one end of the tape body 3 adjacent to the access opening 11. In addition, the support portion 14, in the embodiment, includes at least one stopper 141 adapted to block the flexible control element 4 and at least one strengthener 142 formed an included angle with the stopper 141. With the strengthener 142, the structural strength of the stopper 141 can be increased to avoid damage thereto.

Furthermore, at least one fixation device 5 adapted to selectively fix the tape body 3 is movably configured on the housing assembly 1, and at least one hanger 6 the housing assembly 1; the above is only one of the embodiments of the present invention, but the present invention is not so limited.

Figure 3:
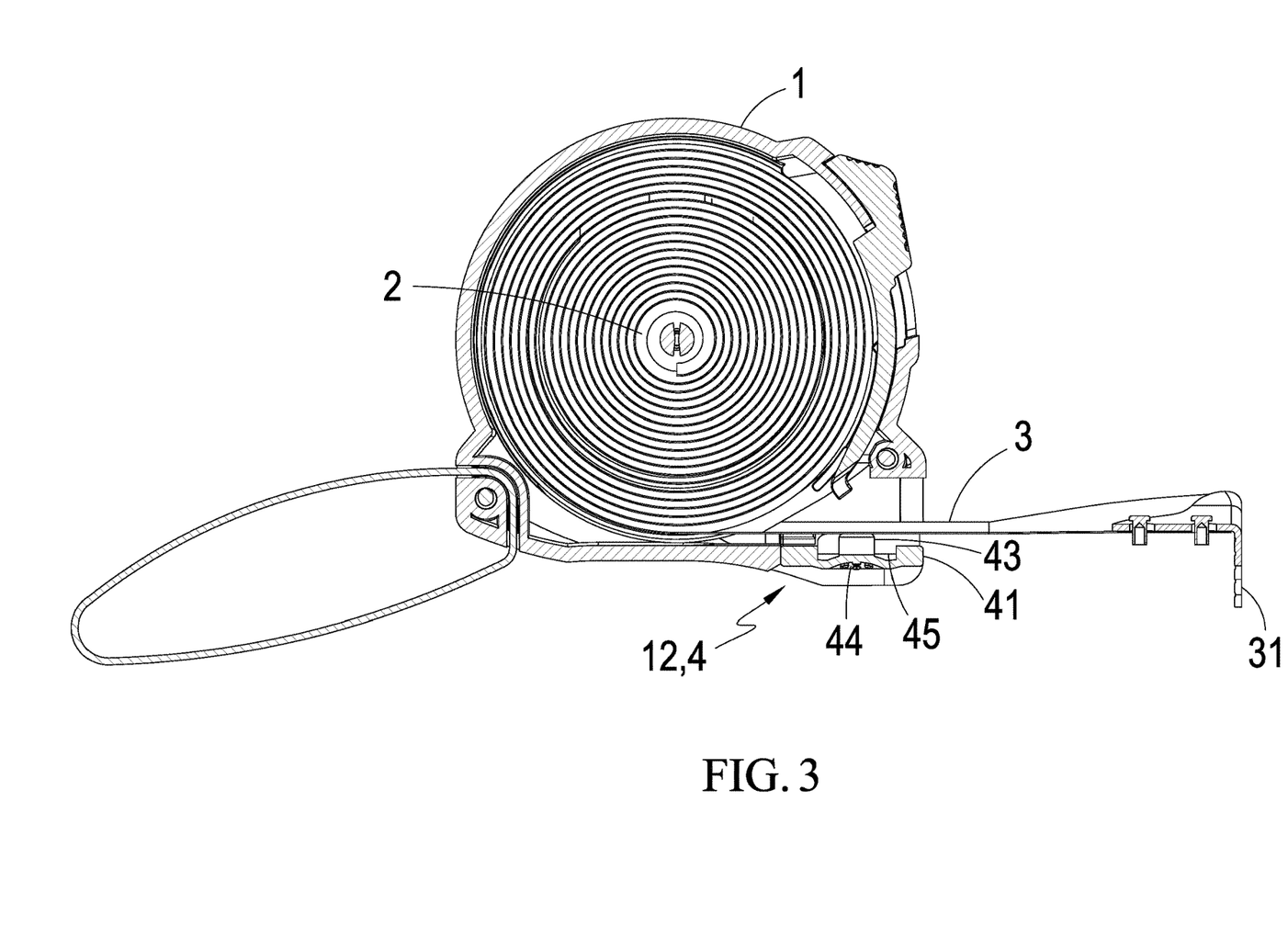
FIG. 3 shows the tape measure structure shown in FIG. 1 upon adjustment.
Figure 4:
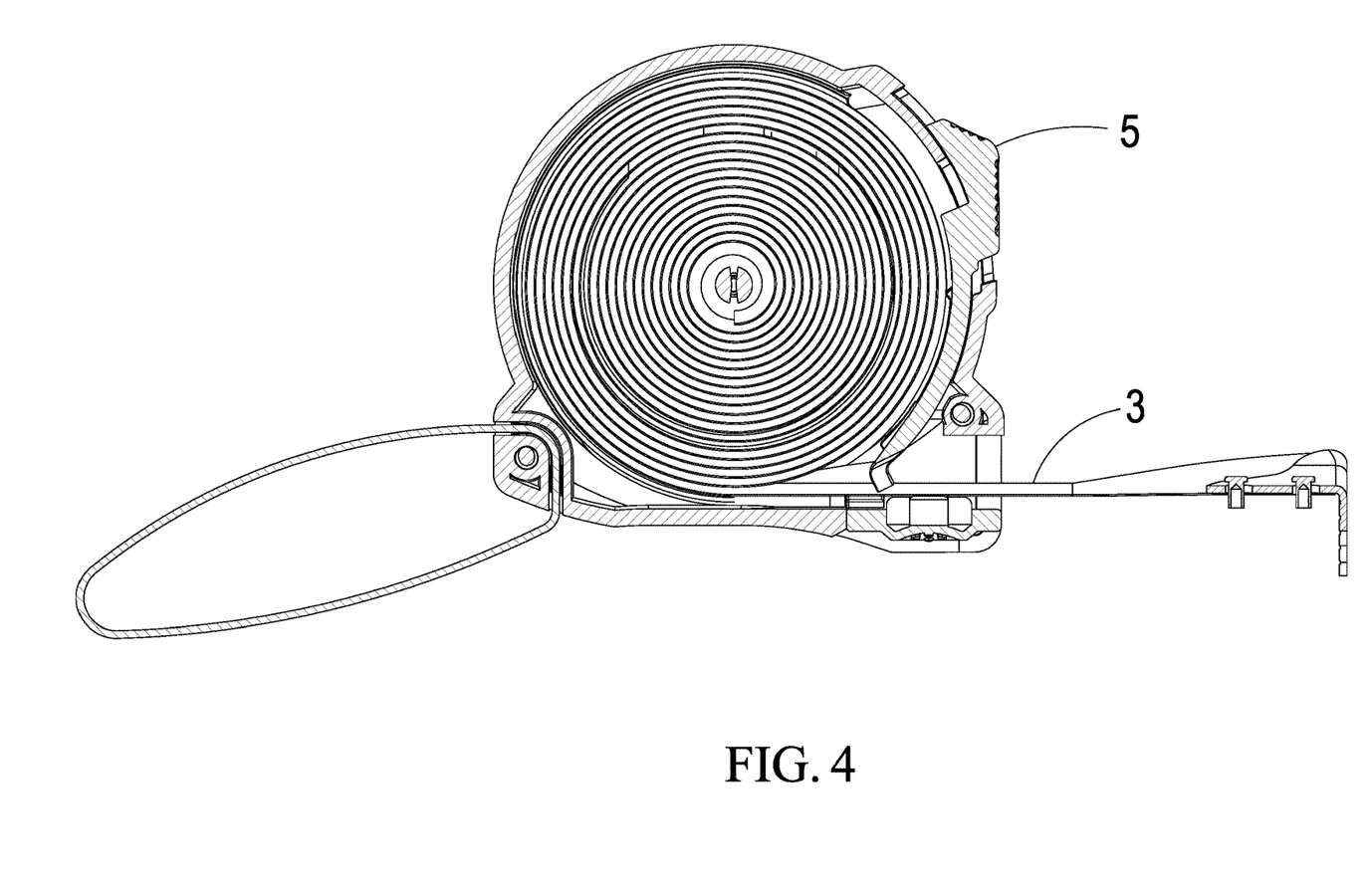
FIG. 4 shown the tap measure structure shown in FIG. 1 upon fixation with a fixing device.
Figure 5:
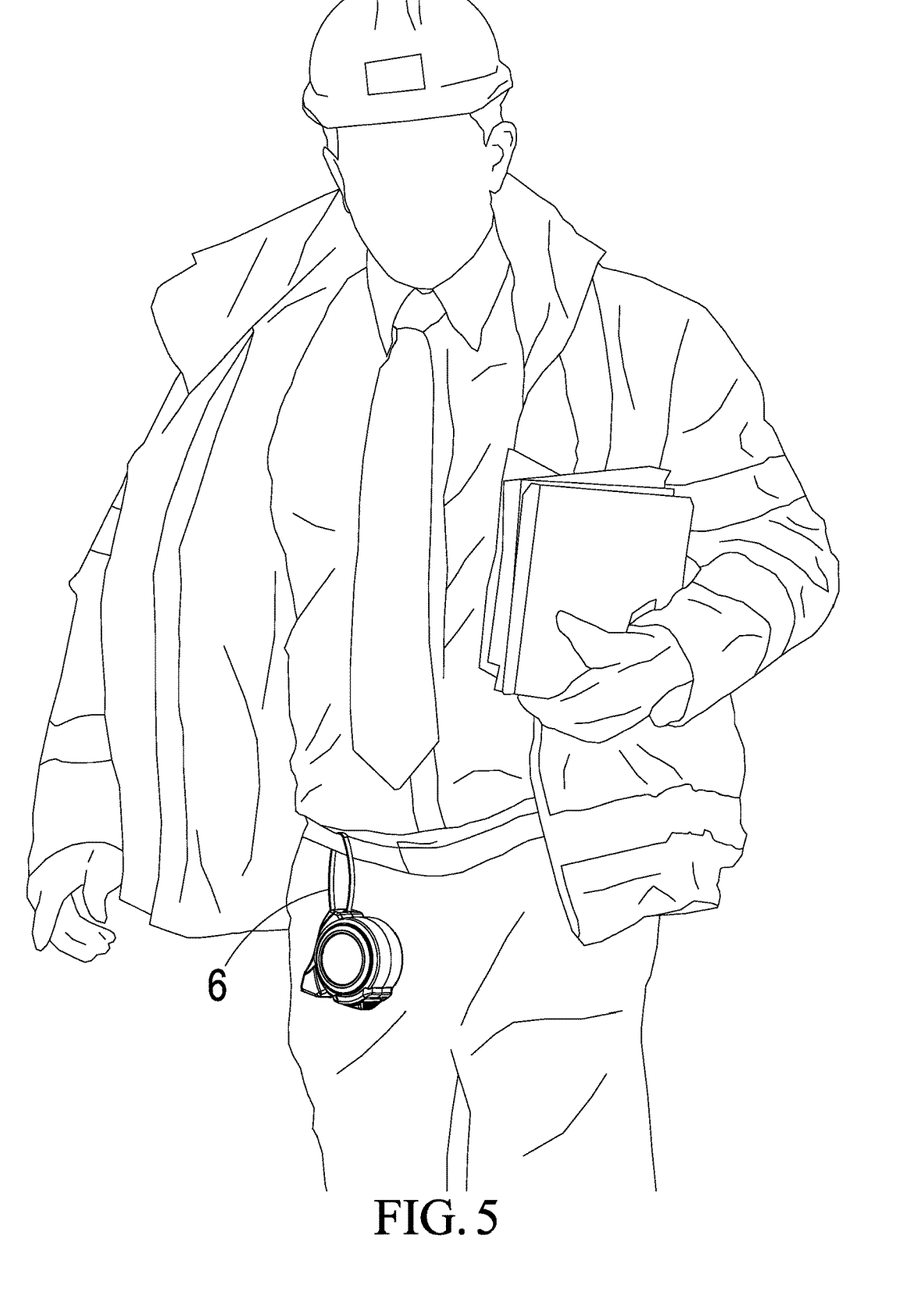
FIG. 5 shows the tape measure structure shown in FIG. 1 when being hung with a hanger.

Referring to FIGS. 1 to 5, it can be seen from FIG. 3 that the flexible control element 4 can shield the tape body 3 because it is positioned above the operation portion 12, so that a user can press the pressing portion 44 to cause it to deform to cause the brake 43 to touch and selectively stop the tape body 3, and the deformation can be more labor-saving through the bending portion 45. In addition, the flexibility of the flexible control element 4 allows users to have hand feeling after the touch, thereby convenient for the operation and the length or speed adjustment, further avoiding the abrasion to the tape body 3, and preventing users from being injured when touching the tape body 3. In addition, the flexibility of the flexible control element 4 can generate a buffering effect, preventing the housing assembly 1 and tape body 3 from being damaged and decreasing collision sound. Furthermore, the support portion 14 including stopper 141 and strengthener 142 is operated in coordination with the limit portion 32 to prevent the flexible control element 4 from being moved and thus separated therefrom.

Referring to FIG. 4 again, a user can also operate the fixing device 5 to selectively fix the tape body 3, and may hang the tape measure of the present invention lightly with the hanger 6 for convenient use of the present invention.

Figure 6:
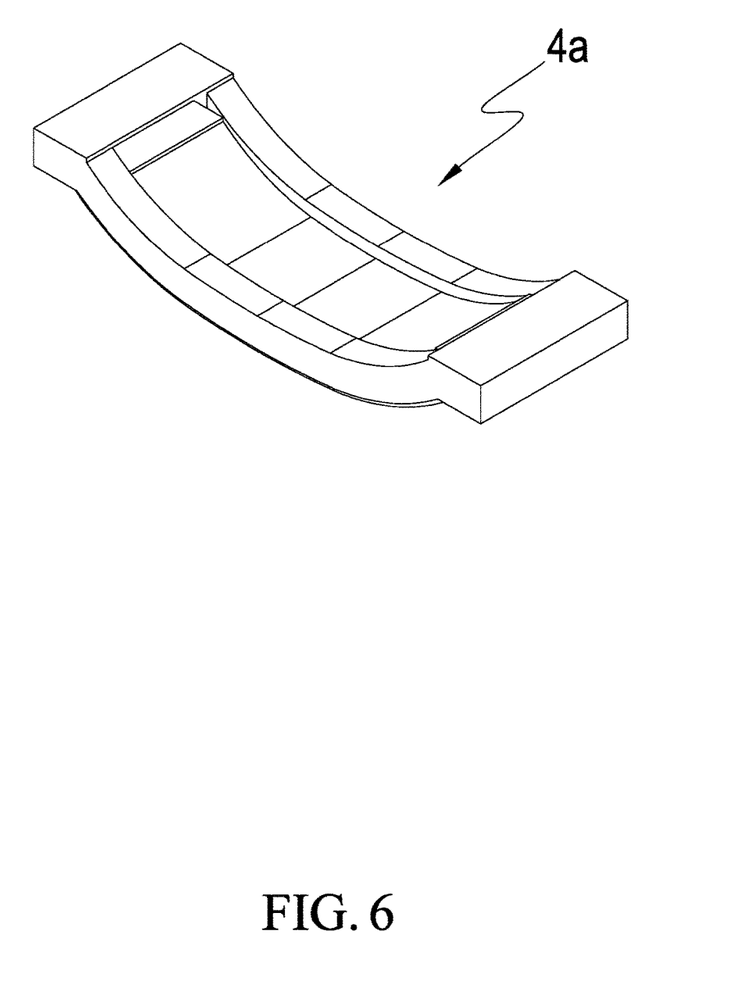
FIGS. 6 to 11 respectively are a schematically perspective view of other preferred embodiment of a flexible control element according to the present invention.

Referring to FIG. 6, a flexible control element 4*a* has a shape different from the flexible control element 4 mentioned above, which explains that the present invention is changeable in style.

Figure 7:
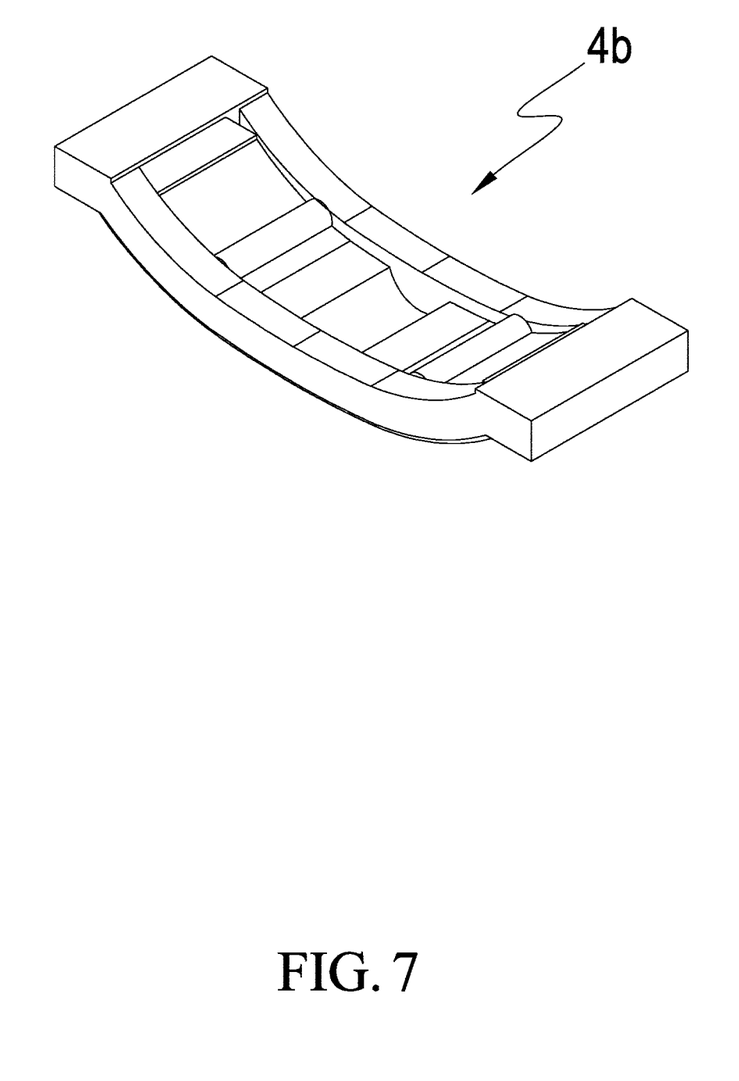

Referring to FIG. 7, a flexible control element 4*b* has a shape different from the flexible control elements mentioned above, which also explains that the present invention is changeable in style.

Figure 8:
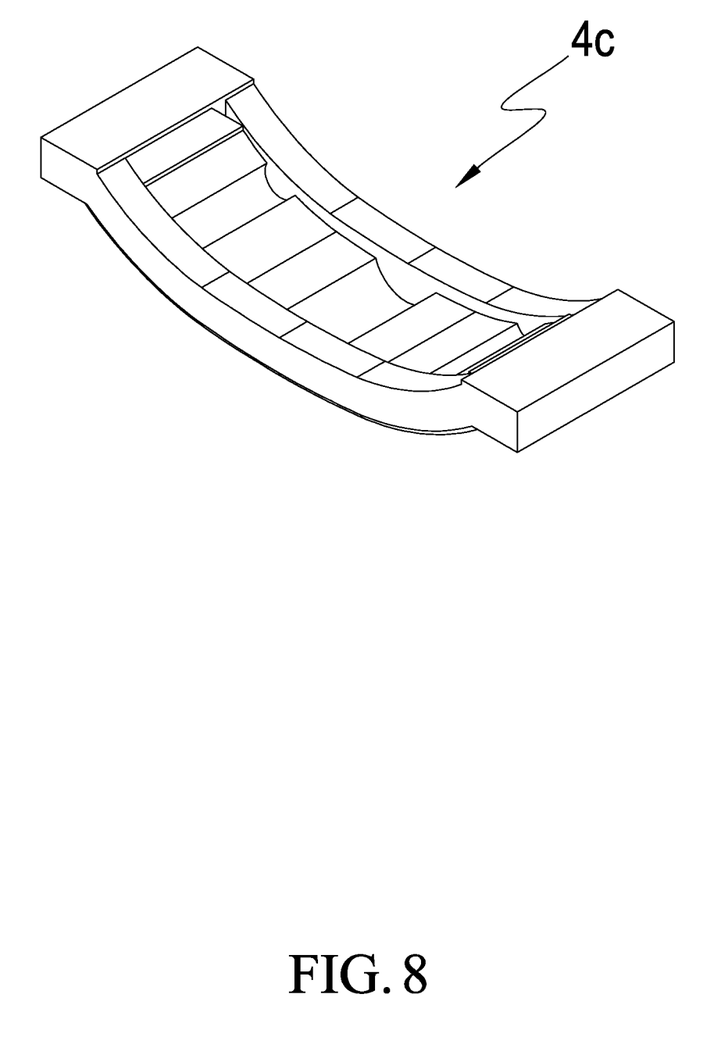

Referring to FIG. 8, a flexible control element 4*c* has a shape different from the flexible control elements mentioned above, which also explains that the present invention is changeable in style.

Figure 9:
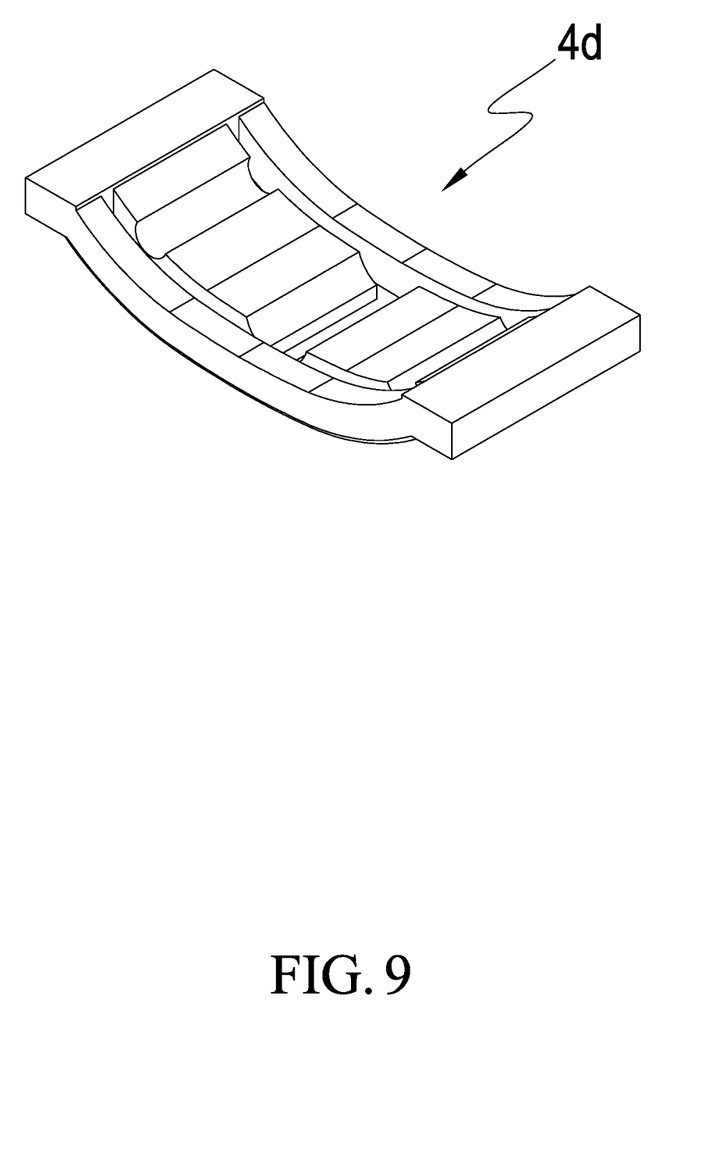

Referring to FIG. 9, a flexible control element 4*d* has a shape different from the flexible control elements mentioned above, which also explains that the present invention is changeable in style.

Figure 10:
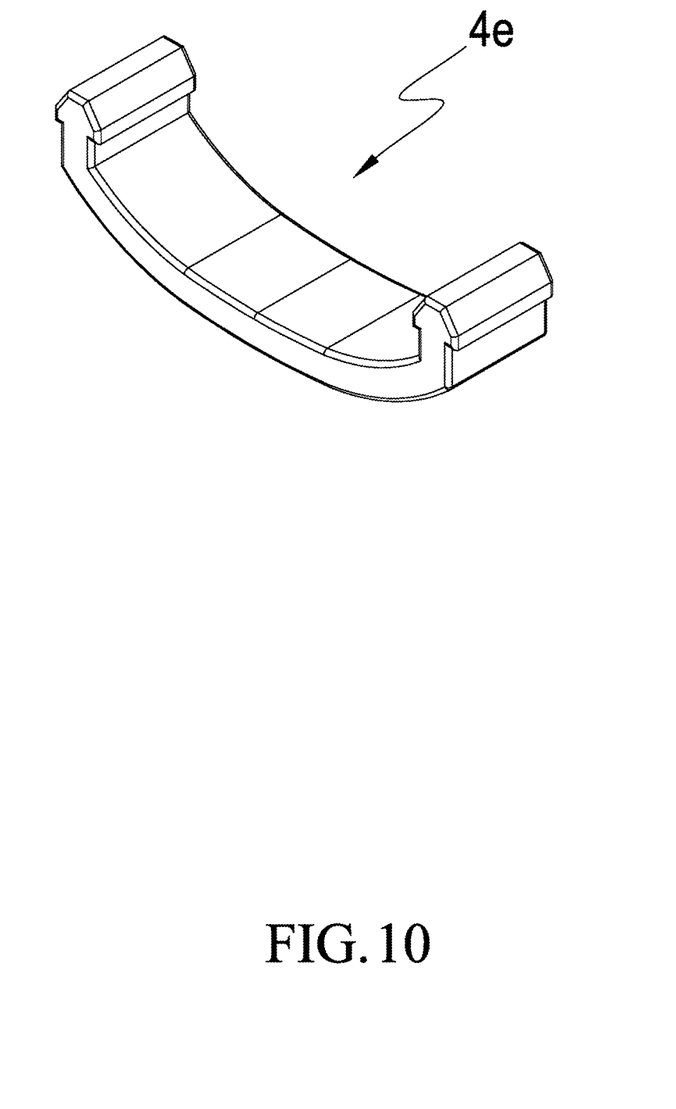

Referring to FIG. 10, a flexible control element 4*e*, in another preferred embodiment, is coupled to the housing assembly by means of fastening as a different implementation, which explains that the present invention is changeable in style.

Figure 11:
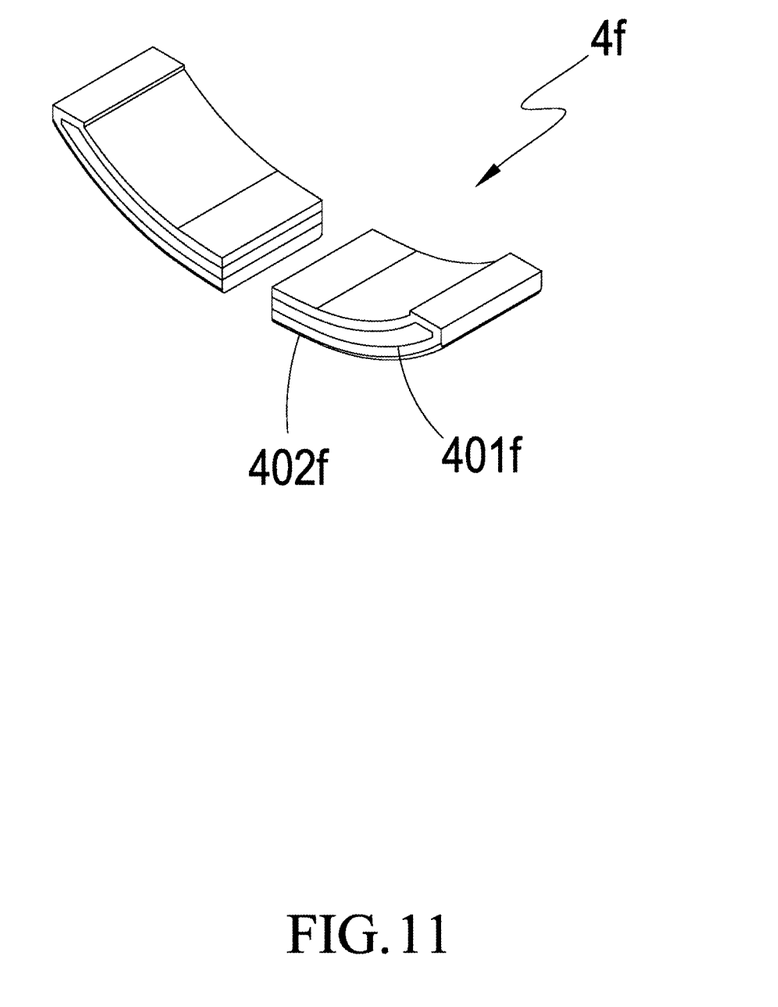

Referring to FIG. 11, a flexible control element 4*f*, in still another preferred embodiment, is coupled to the housing assembly by means of injection as a different implementation, and includes at least one first flexible material 401*f* and at least one second flexible material 402*f* softer than the first flexible material 401*f* and covering it, which also explains that the present invention is changeable in style.

I claim:

1. A tape measure structure, comprising:
   at least one housing assembly;
   at least one rotation disk, movably configured inside said housing assembly;
   at least one tape body, movably put around said rotation disk, one end thereof selectively passed out of said housing assembly;
   at least one access opening, configured on said housing assembly and allowing said tape body to be passed out thereof;
   at least one operation portion, configured on one side of said housing assembly adjacent to said access opening;
   at least one combination portion, configured inside said housing assembly and positioned on one side of said operation portion;
   at least one flexible control element, coupled to said combination portion and adapted to shield a part of said tape body exposed out of said operation portion, and deformable to touch and stop said tape body after pressed down; and
   at least one buffer, configured on one side of said flexible control element adjacent to said access opening.

2. The structure according to claim 1, wherein at least one limit portion is configured on one side of said buffer of said flexible control element away from said access opening, and at least one support portion inserted in said limit portion a position of said housing assembly adjacent to said access opening so as to prevent said flexible control element from being moved to separate therefrom.

3. The structure according to claim 2, wherein said support portion comprises at least one stopper adapted to block said flexible control element, and at least one strengthener formed an included angle with said stopper.

4. The structure according to claim 1, wherein at least one brake is configured on one side of said flexible control element adjacent to said tape body, and at least one pressing portion configured on one side thereof away from said tape body.

5. The structure according to 1, wherein at least one bending portion is configured on said flexible control element to facilitate said deformation.

6. The structure according to claim 1, wherein said flexible control element comprises at least one first flexible material, and at least one second flexible material softer than and covering said first flexible material.

7. The structure according to claim 1, wherein at least one butt joint having a shape similar to said combination portion.

8. The structure according to claim 1, wherein said flexible control element is coupled to said housing assembly by means of plug, fastening or injection.

9. The structure according to claim 1, wherein said rotation disk comprises at least one elastic element adapted to wind back said tape body.

10. The structure according to claim 1, wherein at least one fixing device adapted to selectively fix said tape body is movably configured on said housing assembly.

11. The structure according to claim 1, wherein at least one hanger is configured on said housing assembly.

12. The structure according to claim 1, wherein at least one hook corresponding to said buffer is configured on one end of said tape body adjacent to said access opening.

* * * * *